United States Patent
Das et al.

(10) Patent No.: US 7,352,825 B2
(45) Date of Patent: Apr. 1, 2008

(54) METHOD AND APPARATUS FOR PROVIDING RANDOM ACCESS DETECTION IN A COMMUNICATION SYSTEM

(75) Inventors: Deepak Das, Chatham, NJ (US); Jung Ah Lee, Pittstown, NJ (US); Shirish Nagaraj, Middletown, NJ (US); Anil M. Rao, Hoboken, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 709 days.

(21) Appl. No.: 10/725,095

(22) Filed: Dec. 1, 2003

(65) Prior Publication Data

US 2005/0117675 A1 Jun. 2, 2005

(51) Int. Cl.
*H03K 9/00* (2006.01)
*H03D 1/04* (2006.01)

(52) U.S. Cl. .................. 375/316; 375/346; 375/147

(58) Field of Classification Search ............... 375/343, 375/340, 316–352, 147–153; 708/300
See application file for complete search history.

(56) References Cited

U.S. PATENT DOCUMENTS

| | | | | |
|---|---|---|---|---|
| 4,926,491 | A * | 5/1990 | Maeda et al. | 382/155 |
| 5,764,690 | A * | 6/1998 | Blanchard et al. | 375/147 |
| 6,771,723 | B1 * | 8/2004 | Davis et al. | 375/350 |
| 7,068,628 | B2 * | 6/2006 | Li et al. | 370/334 |
| 2001/0033614 | A1 * | 10/2001 | Hudson | 375/229 |
| 2003/0194113 | A1 * | 10/2003 | Yamaguchi et al. | 382/118 |
| 2004/0077357 | A1 * | 4/2004 | Nakada | 455/452.1 |
| 2004/0095907 | A1 * | 5/2004 | Agee et al. | 370/334 |
| 2005/0018925 | A1 * | 1/2005 | Bhagavatula et al. | 382/278 |
| 2005/0101253 | A1 * | 5/2005 | Pajukoski et al. | 455/63.1 |
| 2005/0227663 | A1 * | 10/2005 | He | 455/296 |
| 2006/0109779 | A1 * | 5/2006 | Shah et al. | 370/201 |

OTHER PUBLICATIONS

Anil M. Rao, Efficient Detection with arrays in the Presence of Angular Spreading, IEEE, IEEE Transactions on Signal Processing, vol. 51, No. 2, Feb. 2003.
U.S. Appl. No. 10/651,200, filed Aug. 29, 2003, Method and arrangement for detecting a random access channel preamble in a communication system.
U.S. Appl. No. 10/649,797, filed Aug. 28, 2003, Method of determining random access channel preamble detection performance in a communication system.

* cited by examiner

*Primary Examiner*—Chieh M. Fan
*Assistant Examiner*—Jason M. Perilla

(57) ABSTRACT

The disclosed embodiments relate to a communication system and method. The system may comprise a pre-whitening device that applies pre-whitening data to a received signal from an antenna array to produce a pre-whitened signal, at least one detector that is adapted to recognize a pattern corresponding to a request for access in the pre-whitened signal and compute correlation data corresponding to the pattern, and a threshold detector that determines whether the correlation data exceeds a threshold and indicates that an acknowledgement signal should be transmitted if the threshold is exceeded. The method may comprise the acts of creating a pre-whitened signal by applying pre-whitening data to a received signal, detecting a pattern that corresponds to a request for access in the pre-whitened signal, computing correlation data corresponding to the pattern, determining whether the correlation data exceeds a threshold, and indicating that an acknowledgement signal should be transmitted if the threshold is exceeded.

13 Claims, 4 Drawing Sheets

METHOD AND APPARATUS FOR PROVIDING RANDOM ACCESS DETECTION IN A COMMUNICATION SYSTEM

BACKGROUND OF THE INVENTION

1. Field of the Invention

The present invention relates generally to providing improved service in a communication system. More particularly, the invention relates to a method and apparatus for providing random access detection.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Communication systems that transmit and receive communication signals continue to grow in importance. Such systems are used to provide television, radio, satellite communication, cell phone service, wireless computing networks and the like. An important aspect of such systems is the ability to efficiently detect when a user is seeking access to a communication system. In a communication system in which a user may attempt to access system resources at any time, a random access detector may be employed to detect when users are attempting to access the system.

Random access is a powerful and commonly used multiple access scheme that allows for multiple users to share the same resources, such as bandwidth and time, in a distributed fashion. The access scheme may be based on minimal feedback from the access point to the different users. The application and utility of random multiple access protocols are well established in both wired and wireless networks.

In a typical wireless cellular system (such as the Universal Mobile Telecommunications System, or UMTS), there are different co-existing schemes for multiple access, such as dedicated code-division for voice, scheduled time/code division for high speed packet data, and random multiple access. In these systems, random access is usually the basis on which a dedicated connection is set up. Apart from initial access into the system, this protocol may also be used in some low and moderate bit-rate data applications.

The efficacy of the random access channel is measured in terms of how long a user has to wait before gaining access to a system (ability to make a call), how much power it expends in doing so, and also from the system's point of view, how many such random accesses can be serviced (throughput), and (to a lesser degree) how much resources get wasted in setting up false connections. System performance parameters such as throughput and delay, which shape the user experience, are directly affected by system settings, such as initial transmit power levels, feedback delays, protocol for retries, false-alarm probability, power ramping step size, number of available access slots and signatures, gaps between consecutive transmissions and the like. However, one of the most important factors that determine these system parameters is the efficacy of the physical layer detector that is employed at the base station receiver. A random access detector that improves system availability is desirable.

SUMMARY OF THE INVENTION

The disclosed embodiments relate to a communication system and method. The system may comprise a pre-whitening device that applies pre-whitening data to a received signal from an antenna array to produce a pre-whitened signal, at least one detector that is adapted to recognize a pattern corresponding to a request for access in the pre-whitened signal and compute correlation data corresponding to the pattern, and a threshold detector that determines whether the correlation data exceeds a threshold and indicates that an acknowledgement signal should be transmitted if the threshold is exceeded. The method may comprise the acts of creating a pre-whitened signal by applying pre-whitening data to a received signal, detecting a pattern that corresponds to a request for access in the pre-whitened signal, computing correlation data corresponding to the pattern, determining whether the correlation data exceeds a threshold, and indicating that an acknowledgement signal should be transmitted if the threshold is exceeded.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In a cellular telephone system, the system design of the Random Access Channel (RACH) may entail three phases: (a) detection algorithm design, (b) dimensioning of resources per cell, (c) resource optimization. Embodiments of the present invention relate to the design of optimal detection strategies for base stations with antenna arrays. Providing improved performance in such a situation may be subject to pragmatic constraints on implementation complexity. The resulting solutions may depend on the spatio-temporal channel characteristics assumed for the deployment environment. In this respect, the solutions provided vary in complexity starting from an optimal detector structure, to other simplified, but sub-optimal, detection structures. The detector structures may also vary depending on the channel scattering conditions. The analysis of the optimum detector performance in terms of the probability of detection and false alarm may reveal design tradeoffs that may be exercised to come up with practical detector structures. Embodiments of the present invention may additionally relate to a fixed-beam detector that can accommodate non-white interference in an actual communication environment.

1. Introduction

Embodiments of the present invention may relate to the design of efficient and optimal space-time receivers for base stations employing multiple antennas. The specific exemplary embodiments described herein relate to Universal Mobile Telecommunications Systems (UMTS). Those of ordinary skill in the art, however, will appreciate that embodiments of the present invention may relate to other types of communication systems. A brief description of the random access protocol in UMTS is provided herein by way of example.

Figure 1:
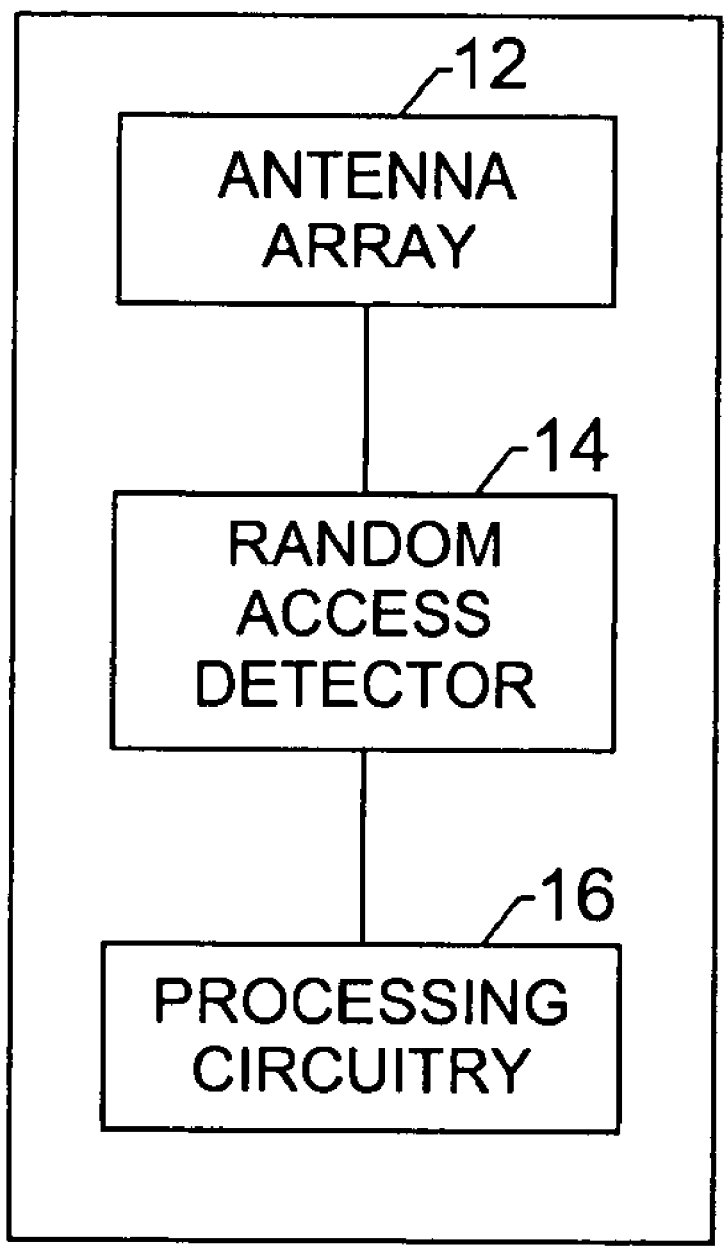
FIG. 1 is a block diagram of a communication system in accordance with embodiments of the present invention.

FIG. 1 is a block diagram of a communication system in accordance with embodiments of the present invention. The communication system is generally referred to by the reference numeral 10. The communication system 10 may comprise a cellular telephone base station, for example. In addition, the communication system 10 may operate according to the UMTS standard. An antenna array 12 may be comprised of a plurality of antenna elements for receiving signals from and transmitting responsive signals to a plurality of mobile transceivers that may be located within the coverage area or cell provided by the communication system 10.

Because the mobile transceivers may attempt to access system resources at any time, the communication system 10 may be regarded as a random access system. A random access detector 14 may be connected to the antenna array 12 to detect access signals from the plurality of mobile transceivers within the cell. Processing circuitry 16 may be adapted to receive user signals from the plurality of mobile transceivers after their respective access signals are detected by the random access detector 14.

The random-access transmission in UMTS is based on a slotted ALOHA approach with fast acquisition indication. Slotted ALOHA is a random access protocol in which stations may request access to the network randomly (but only at well-defined access slot-boundaries) by issuing a transmission request and listening for a response (again, only at slot-boundaries). The station may transmit if an acknowledgement is received within a predetermined time period. Communication is synchronized using synchronization pulses and time slots.

A mobile transceiver, which may be referred to as the "mobile" or the user equipment (UE) may start transmission in one of several access slots which are at well-defined time offsets, relative to the frame boundary of every second frame of the received broadcast channel of the current cell. There are 15 access slots per two 10 ms frames and they are spaced 5120 chips apart. The random-access transmission consists of several preambles, each of length 4096 chips followed by a message of either 10 ms or 20 ms duration. The preamble consists of 256 repetitions of a signature, each of length 16. The acquisition of a UE based on the preamble involves binary hypothesis testing that may use decision statistics collected over a certain number of sub-correlators (that account for one preamble transmission) at any search window that is sufficient to cover the delay for a given cell size. Failure to detect an acknowledgement signal leads to power ramping of the following preamble by a pre-determined offset up to a pre-defined maximum number of times. With multiple receive antennas at the base station, the detection of each preamble can fully capitalize on their diversity or spatial discrimination benefits.

The random access signal model is described below in Section 2, and the structure of a random access detector in accordance with embodiments of the present invention is presented in Section 3 for both symmetric and non-symmetric antenna configurations. An alternative embodiment of the invention that may be deployed in a fixed beam network and that can handle spatially selective interference in actual communication environments is discussed.

2. Random Access Signal Model

Assume that the antenna array 12 uses N receiving antennas, which are divided in C diversity clusters, each with M closely spaced antennas. For example, an antenna array with C=1 and M=4 will be referred to as the Uniform Linear Array-4V, or ULA-4V configuration. The clusters can offer receive diversity either by being spaced apart by multiples of the wavelength, or by orthogonal polarization. The above description assumes symmetry in the antenna configuration, which might not be present in antenna systems with unequal number of antennas per spatial diversity branch, as in the Clustered Linear Array-3X, or CLA-3X configuration, where there are three closely spaced antennas in one cluster and a single antenna in the other cluster. The formulation can handle this case also although it leads to a somewhat different detection statistic. For simplicity of development, only the symmetric antenna configuration in modeling the random access signal is considered herein.

The mobile transceivers within the cell covered by the communication system 10 may send the preamble for gaining access into the system by spreading a certain signature sequence. The mobile transceivers may monitor the primary common pilot channels from different cells and establish a primary cell that is the strongest. The signature is chosen from a known set of possible signature waveforms. The scrambling code is chosen from the allowed scrambling codes that are specific to the cell. The allowed values of the signatures and scrambling codes are obtained by demodulating the broadcast channel that is sent by the primary cell.

The transmitted random access signal is of the form:

$$m(t) = \sqrt{E_c}\, c(t)s(t) = \sqrt{E_c} \sum_i m_i \delta(t - iT_c)$$

where c(t) is the spreading/scrambling code and s(t) is the specific signature code chosen by the user randomly from the available set. Here, $E_c$ is the transmitted power, $T_c$ is the chip-interval and the sequence $m_i$ denotes the combination of the scrambling and signature waveforms.

The received signal at the base station is given by:

$$r(t) = \sum_{l=1}^{L} h_{\tau_l} m(t - \tau_l) + v(t) \qquad (1)$$

The noise and interference term $v(t) \sim CN(0, R_v)$ consists of the multi-user interference as well as thermal noise. As used herein, $x \sim CN(\mu,R)$ denotes that the random vector x is a complex-valued circularly symmetric jointly Gaussian vector signal with mean $\mu$ and covariance R. The multipath channel vector at a delay $\tau_l$ is also modeled as $h_{\tau_l} \sim CN(0, R_h(\tau_l))$.

One of the main purposes of the random access channel is to establish a connection (access acquisition) and also to identify the strong multipath for helping the demodulation of other signals from the same user. An important concern in a random access system is acquisition detection, i.e., the detection of whether a user is requesting access into the network. The common mechanism for random access involves multiple retries if no acquisition indication is found. The improvement of link performance by any enhanced receiver processing results in reduced retries to gain access, thus leading to increased throughput for the random access channel in a cellular network.

A receiver may entail the use of multiple code-matched filters (matched, with different time offsets, to all the possible scrambling and signature sequences that are allowed). For each of these time offsets that are evaluated for the possible presence of a signal, the spatial signal model if a signal is present at a delay $\tau$ looks like:

$$y_\tau = r(t)*m*(\tau-t) = Ah_\tau + v_\tau \quad (2)$$

where '*' denotes the convolution operation, $m*(t)$ is the complex conjugate of $m(t)$, $A=\sqrt{N_c E_c}$ and $N_c$ is the processing gain. Here, the time offset $\tau$ is chosen in multiples of the fraction of a chip interval. The above equation holds for any $\tau=\tau_l, l=1,2,\ldots,L$. The noise vector $v_\tau(j)$ consists of thermal noise plus multi-user interference after code-matched filtering at a certain time-offset $\tau$. The convolution above may not be defined not over the whole signature sequence length, but over smaller periods. To undo the effects of high velocity users, the length of the coherent accumulation (performed by the matched filter) may be shortened such that there are, say, K sub-blocks in one access slot. Across these K sub-blocks, we may assume that the channel is fading independently. This results in time diversity at the receiver. The other mode of diversity arises from the spatial dimension, where the vector channel seen at any antenna cluster is independent of that seen at another cluster. Detectors that operate in accordance with embodiments of the present invention may take into account and utilize the beneficial effects of both these forms of diversity that are present inherently in the system.

3. Detector Structures

In this section a generalized likelihood ratio test (GLRT) problem is considered and detectors for symmetric and non-symmetric antenna configurations are discussed. More general detector structures that arise by invoking additional modeling assumptions are also developed. Lastly, an embodiment of the present invention that is adapted for use in a fixed beam network and is able to handle spatially non-white interference is discussed.

3.1. GLRT-Optimal Detection 3.1.1. Symmetric Antenna Configuration

A symmetric antenna configuration refers to an antenna array 12 that has C spatial clusters of M antennas each. It is useful to first consider the modeling of the two forms of diversity that are present in such a system. The temporal and spatial forms of diversity can be clubbed into a generic source of diversity because they both result in the channels being independent from one block to another. Thus, it may be stated that the system is one which has J=CK sources of diversity, where K is the number of sub-correlators (or matched filters) within an access slot and C is the number of spatial clusters of antennas. It may be assumed that the spatial statistics of the vector channels to the different clusters remain the same because a symmetric configuration is being considered.

For the signal model in Equation (2), the detection problem can be written in the classical form of detecting a Gaussian signal in Gaussian noise. The fact that the statistics of the signals remain the same whether the diversity source is due to time or space allows us to cast the detection problem for the code-matched filter corresponding to an offset $\tau$ as follows:

$$H_0(\tau): y_\tau(j) = v_\tau(j) \; j=1,2,\ldots,J=CK$$

$$H_1(\tau): y_\tau(j) = Ah_\tau(j) + v_\tau(j) \; j=1,2,\ldots,J \quad (3)$$

The characteristics of the spatial channel $h_\tau(j)$ have to be taken into account in order to derive optimal detector structures. The simplest model to consider is that of a small per-path angular spread model. In this case, the channel looks like:

$$h_\tau(j) = h_\tau(j)u_\tau = h_\tau(j)\alpha(\theta_\tau) \Rightarrow R_h(\tau) = \sigma_h^2(\tau)(\tau)u_\tau u_\tau^\dagger$$

where $u_\tau$ is the channel correlation vector across antennas. In the case of zero angle spread, $$u_\tau = \alpha(\theta_\tau) = [1 \, e^{-j2\pi d \sin(\theta_\tau)/\lambda} \, e^{-j4\pi d \sin(\theta_\tau)/\lambda} \, e^{-j2(M-1)\pi d \sin(\theta_\tau)/\lambda}]^T$$

where $\theta_\tau$ is the desired user's angle of arrival at a multipath with delay $\tau$. For small angle spreads, we can approximate the true spatial distribution by the model of a perfectly correlated spatial channel.

For a known $u_\tau$, the problem posed in Equation (3) is the well-known problem of detecting a Gaussian signal embedded in Gaussian noise. Because the problem formulation is on a per—$\tau$ basis, we drop the sub-script $\tau$ on the vector $u_\tau$ henceforth with the understanding that the correlation vector (or the steering vector, as the case may be) is different for different multipaths.

The Neyman-Pearson likelihood ratio test detects the signal to be present if:

$$L(y_\tau(1),\ldots,y_\tau(J);u) = \frac{f(y_\tau(1),\ldots,y_\tau(J)|H_1(\tau);u)}{f(y_\tau(1),\ldots,y_\tau(J)|H_0(\tau))} > \eta \quad (4)$$

Here, the threshold $\eta$ is chosen so as to maintain a certain probability of false alarm $p_{fa}$. The generalized likelihood ratio test (GLRT) can be employed, wherein the hypothesis test reduces to:

$$\max_{\{u|\|u\|^2=M\}} L(y_\tau(1),\ldots,y_\tau(J);u) = \frac{\max_u f(y_\tau(1),\ldots,y_\tau(J)|H_1;u)}{f(y_\tau(1),\ldots,y_\tau(J)|H_0)} > \eta$$

The detection statistic for the GLRT can be derived as follows:

$$\max_{\|u\|^2=M} L(y_\tau(1), \ldots, y_\tau(J); u) = \max_{\|u\|^2=M} \frac{\prod_{j=1}^{J} f(y_\tau(j) | H_1(\tau); u)}{\prod_{j=1}^{J} f(y_\tau(j) | H_0(\tau))} \quad (5)$$

$$= \max_{\|u\|^2=M} \frac{\det(R_v)^J}{\det(A^2\sigma_h^2(\tau)uu^\dagger + R_v)^J}$$

$$\frac{e^{-\sum_j y_\tau^\dagger(j)(A^2\sigma_h^2(\tau)uu^\dagger + R_v)^{-1} y_\tau(j)}}{e^{-\sum_j y_\tau^\dagger(j)R_v^{-1} y_\tau(j)}}$$

$$= \max_{\|u\|^2=M} \frac{e^{A^2\sigma_h^2(\tau)u^\dagger R_v^{-1}\hat{R}_y(\tau)R_v^{-1}u/(1+A^2\sigma_h^2(\tau)u^\dagger R_v^{-1}u)}}{(1 + A^2\sigma_h^2(\tau)u^\dagger R_v^{-1}u)^J}$$

where $$\hat{R}_y(\tau) = \sum_{j=1}^{J} y_\tau(j)y_\tau^\dagger(j)$$

is the spatial sample correlation matrix formed from the observations. The form of the likelihood ratio as in Equation (5) is derived in a straightforward manner by invoking the matrix inversion lemma.

The GLRT detector can be approximated to solve the following problem (instead of solving the one in Equation (5)):

$$\max_{\|u\|^2=M} u^\dagger R_v^{-1}\hat{R}_y(\tau)R_v^{-1}u$$

for which the solution is $$\hat{u} = \sqrt{M}(\text{principal eigenvector of } R_v^{-1}\hat{R}_y(\tau)R_v^{-1}) \quad (6)$$

In the special case of spatially white input (such as a voice-only kind of uplink loading), the detection statistic can be expressed more easily. Denoting $\lambda_{max}(A)$ to be the maximum eigenvalue of A, we have that the optimal detection rule for detecting $H_1(\tau)$ becomes:

$$S(\tau) = \lambda_{max}(\hat{R}_y(\tau)) > \eta' \quad (7)$$

where $S(\tau)$ denoted the detection statistic and $$\eta' = \frac{\sigma_v^2(\sigma_v^2 + MA^2\sigma_h^2(\tau))}{MA^2\sigma_h^2(\tau)}\left[\log\eta + J\log\left(1 + \frac{MA^2\sigma_h^2(\tau)}{\sigma_v^2}\right)\right]$$

Because the threshold is found using the constraint on the probability of false alarm, we can directly find the threshold $\eta'$, thus circumventing the need to know parameters like A and $\sigma_h^2(\tau)$.

3.1.2. Non-Symmetric Antenna Configuration

The following discussion relates to the signal model and the detection problem for any general distribution of antennas into clusters. For ease of elaboration, we focus on the non-symmetric CLA-3X configuration, where there are three closely spaced antennas on one diversity branch and a single antenna on the other branch.

For this CLA-3X configuration, previously developed signal models may not be sufficient. If the channels to the two clusters are denoted by $h_{\tau,1}(k)$ and $h_{\tau,2}(k)$, where the variable $k \in \{1,2,\ldots,K\}$, the signal model becomes:

$H_0(\tau): y_{\tau,1}(k) = v_{\tau,1}(k) \quad k=1,2,\ldots,K$ $y_{\tau,2}(k) = v_{\tau,2}(k)$ $H_1(\tau): y_{\tau,1}(k) = Ah_{\tau,1}(k) + v_{\tau,1}(k) \quad k=1,2,\ldots,K$ $y_{\tau,2}(k) = Ah_{\tau,2}(k) + v_{\tau,2}(k) \quad (8)$ It follows that the eventual solution for the optimum u remains of the same form as before and one of the solutions can be formed as the scaled maximum eigen-vector of $R_v^{-1} \hat{R}_{y_1}(\tau) R_v^{-1}$.

The detection statistic for CLA-3X is a little different from the earlier case. For example, in a spatially white environment, the test statistic for detecting $H_1(\tau)$ is:

$$S(\tau) = \frac{M}{(1+M\gamma)}\lambda_{max}(\hat{R}_{y_1}(\tau)) + \frac{1}{(1+\gamma)}\sum_{k=1}^{K}|y_{\tau,2}(k)|^2 > \eta'$$

where the per-antenna signal to noise ratio is defined as $\gamma = A^2\sigma_h^2(\tau)/\sigma_v^2$. Also, as before, $\eta'$ is monotonically related to $\eta$ and is set at a value to satisfy the false alarm probability constraint. Thus, it may be observed that in the case of CLA-3X, an extra parameter ($\gamma$), which has to be estimated from open-loop power control settings, is not needed. If the initial power settings are such that it is very much larger than 1, $\gamma \gg 1$, then the detection statistic boils down to:

$$\lambda_{max}(\hat{R}_{y_1}(\tau)) + \sum_{k=1}^{K}|y_{\tau,2}(k)|^2 > \eta''$$

3.1.3. Implementation Considerations

The maximum eigenvalue computation is a somewhat intensive operation, and implementation difficulties may arise for at least a portion of the possible time offsets $\tau$. A low-complexity implementation may be to first reduce the time search into a possible range of $\tau$'s by doing simple non-coherent diversity combining detection on a single antenna (or a pair of diversity antennas), followed by the optimal spatio-temporal detection algorithm over the restricted ranges of time offsets.

The solution given in Equation (6) is expected to be robust to increased wide-band angle spread since it is a feasible solution even for non-zero angle spreads. When there is increased angle spreading, for low velocities in ULA-4V (i.e., no time-diversity or spatial diversity), the maximum eigenvector solution has the capability to do "instantaneous" beamforming, with the solution resembling the conjugate of the instantaneous channel at high signal to noise ratio. Thus, the detector may take advantage of angle diversity (this arises due to angle spread, due to which channels get de-correlated even for closely spaced antennas).

The form of the maximum eigenvector detector in Equation (6) suggests a common front-end implementation by a universal pre-whitening matrix at the antenna for all the users. This can be implemented as the inverse of the Cholesky factor of $R_x$. In general, the pre-whitening matrix may comprise a square root matrix of an input correlation matrix, which is derived from the input signal received from a mobile transceiver. The pre-whitening operation results in a pre-whitened signal that has uncorrelated components. Thus, the pre-whitening data is a function of the input signal correlations and is used to remove correlations that occur in the input signal.

Here, the spatial correlation matrix of the total signal is denoted by $R_x$, which very well approximates $R_v$ when there is not one single dominating source of transmission. Denoting the whitened signal as $z_\tau(j)$ and the inverse of the Cholesky factor of $R_x$ by $P_x$, it may be deduced that $$\hat{u} = \sqrt{M}(\text{principal eigenvector of } P_x^\dagger \hat{R}_z(\tau) P_x)$$

Because the optimal spatial pre-combiner for dedicated channels also has a form similar to the above solution, the pre-whitening matrix transform forms a common front-end spatial processing block for all users, both of the random access and the dedicated channels types. A general architecture for a random access detector in accordance with embodiments of the present invention is discussed below with respect to FIG. 2.

Figure 2:
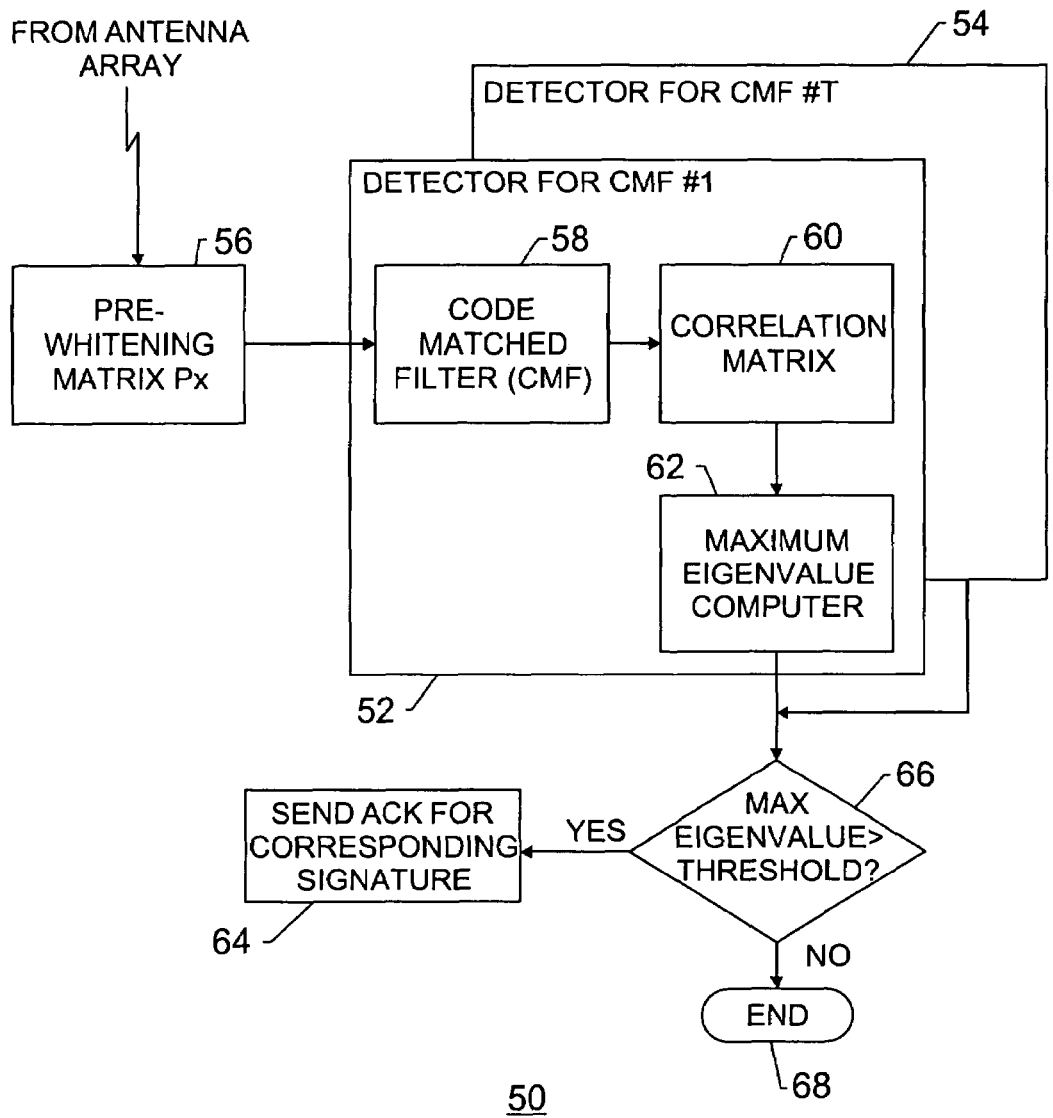
FIG. 2 is a block diagram of a random access detector in accordance with embodiments of the present invention.

FIG. 2 is a block diagram of a random access detector in accordance with embodiments of the present invention. The random access detector is generally referred to by the reference numeral 50. The random access detector 50 may comprise a plurality of detectors, each of the detectors being adapted to detect a different preamble or signature from a mobile transceiver. The different preambles or signatures may correspond to requests for service from various mobile transceivers in a cell at a given time. For purposes of simplicity, the exemplary random access detector shown in FIG. 2 is adapted to detect a single preamble or signature.

A detector 52 may be adapted to detect a specific preamble or signature at a first time delay. A detector 54 may be adapted to detect the same preamble or signature at a Tth time delay. Those of ordinary skill in the art will appreciate that the effectiveness of the random access detector 50 may improve as detectors for more time delays are added for each specific preamble or signature.

To detect an incoming request for service, the random access detector 50 may monitor signals received from an antenna array such as the antenna array 12 (FIG. 1), which may include closely spaced antenna elements. The antenna array 12 may additionally comprise a plurality of widely dispersed clusters, each of the clusters being comprised of a plurality of closely spaced antenna elements. The signals received from the antenna array 14 may be processed by a pre-whitening matrix $P_x$ 56 to enhance the detectability of preambles or signatures contained within the signal.

After processing by the pre-whitening matrix $P_x$ 56, the pre-whitened signal is delivered to a code matched filter (CMF) 58, which is adapted to detect a signal corresponding to a particular preamble or signature. The output signal from CMF 58 is processed by the correlation matrix computation block 60.

The correlation data applied at block 60 may comprise user-specific data derived in part from the input signal received from a mobile transceiver. The correlation data indicates the general direction from which the user's signal is arriving. The correlation data thus helps to localize the user's Angle of Arrival (AoA), which may be used for beamforming to improve the signal to noise ratio for the detection of that user. The use of correlation data improves the odds of detecting a genuine attempt to access the network by a user, rather than a false alarm.

Maximum eigenvalues for the correlation matrix are computed by a maximum eigenvalue computer 62. At block 66, the maximum eigenvalues for each of the detectors 52 through 54 are examined to determine if the maximum eigenvalues for any time delay exceed a threshold. If the maximum eigenvalues for any time delay exceed the threshold, an acknowledgement signal may be sent for the corresponding preamble or signature, as shown at block 64. If the maximum eigenvalues do not exceed the threshold for any of the time delays, no acknowledgement signal is sent and the process ends, as shown at block 68. It must be noted that the above described detector is a possible embodiment of a random access detector that uses the correlation matrix of the despread signals. Depending on the scattering conditions of the channel, different detector structures may be derived, all of which may require the computation of the correlation matrix of the received despread random access signals and a universal pre-whitening block.

3.3. Fixed Beam Detection for Spatially Non-White Interference

Antenna arrays may be used to perform beamforming to enhance reception of signals from different angles of arrival, and transmit beamforming to enhance the quality of transmission of signals to different users. Phase offsets between signals received from a user on different elements of the antenna array depend on the angle of arrival of the user's signals at the antenna array. This phenomenon can be utilized to combine signals arriving from a desired direction constructively at the base station receiver using a receive beamformer. A receive beamformer is a device that receives inputs from the various elements of an antenna array and combines them into output signals based on certain criteria.

Beamformers may be employed to create configurations known as fixed beam networks. In a fixed beam network or system, a beamformer may be adapted to provide a plurality of beams by maximizing signal strengths towards a plurality of fixed or predefined directions. A set of beamformer weight coefficients are stored for each fixed beam serving a specific portion of the cell. When users are within the proximity of one of the fixed beams, their signal reception from the base station is strong. The beamforming weight coefficients that are applied for any user in the system are chosen to be the coefficients corresponding to the strongest fixed beam for that user. Fixed beam networks are generally a compromise between complexity and performance, since they are generally easier to implement than dynamically computing beamforming weight coefficients individually for each user in the system.

Figure 3:
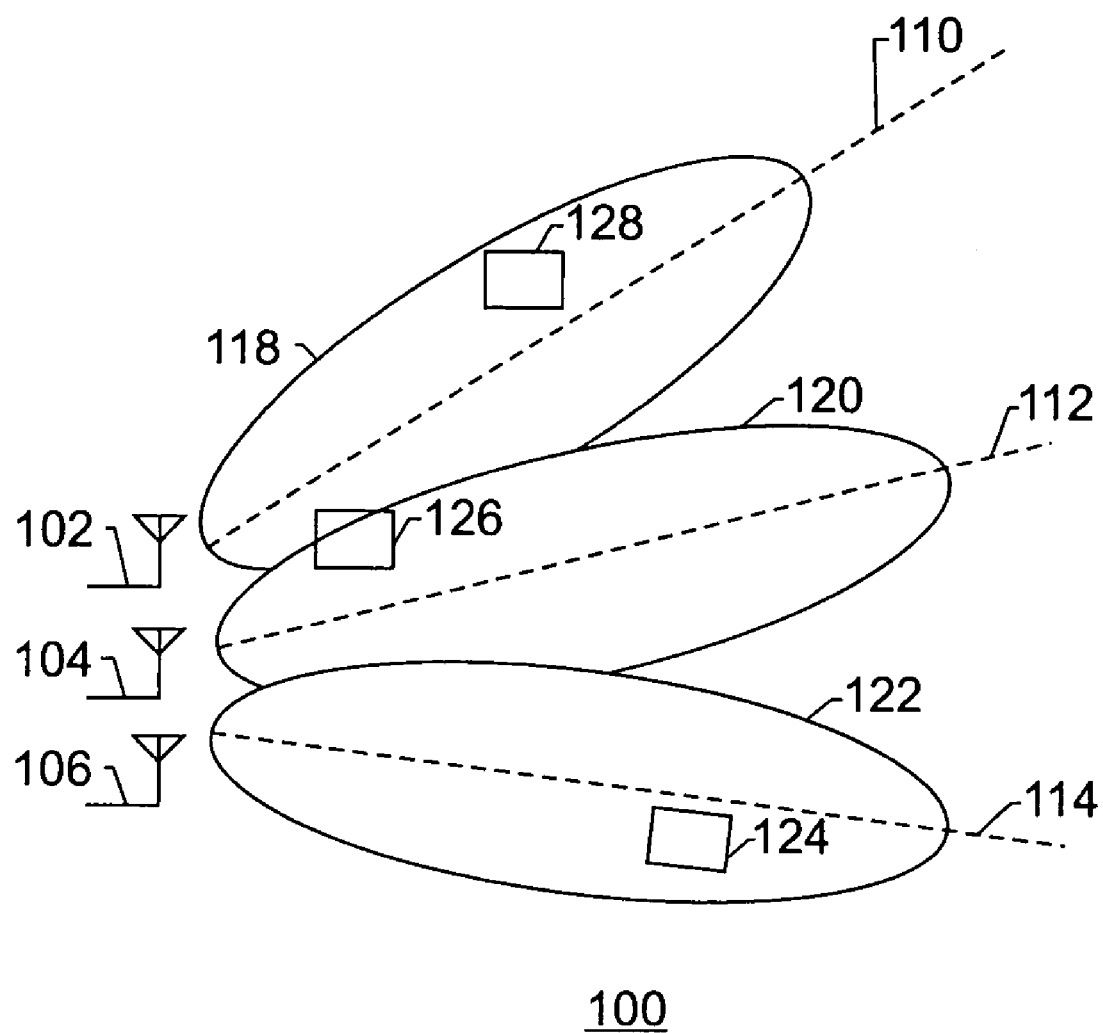
FIG. 3 is a block diagram showing the deployment of fixed beams in a fixed beam network in which embodiments of the present invention may be practiced.

FIG. 3 is a block diagram showing the deployment of fixed beams in a fixed beam network in which embodiments of the present invention may be practiced. The fixed beam network is generally referred to by the reference numeral 100. A random access detector 14 (FIG. 1) in accordance with embodiments of the present invention may be employed in the fixed beam network illustrated in FIG. 3.

In FIG. 3, the fixed beam network 100 is established by a three-element antenna array that comprises antenna elements 102, 104 and 106. The antenna array may comprise a portion of a cell tower or the like. A beamformer (not shown) may be adapted to provide three fixed beams 110, 112 and 114. Each of the fixed beams 110, 112 and 114 provide a coverage envelope where reception is the strongest. In FIG. 3, the fixed beams 110, 112 and 114 respectively provide coverage envelopes 118, 120 and 122. The fixed beam network 100 may provide cellular service to mobile transceivers 124, 126 and 128, which may be located within the coverage envelopes 118, 120 and 122 at any given time.

In a fixed beam network, the random access detector 14 (FIG. 1) may project the received signal $y_\tau$ onto the fixed beam directions, which may be assumed to be equal to the number of closely spaced antennas in a cluster (for a symmetric antenna configuration). The detector then works on this projected signal in the following manner:

Define $W = [w_1^\dagger, w_2^\dagger, \ldots, w_M^\dagger]$ $\|w_i\|^2 = 1 \, \forall i$ $z_\tau(j) = W y_\tau(j)$ The fixed-beam matrix W may or may not be chosen to be an orthogonal matrix. Considering the signal model in the beam-space, the following results:

$H_0(\tau): z_\tau(j) = n_\tau(j) \, j=1,2,\ldots,J$ $H_1(\tau): z_\tau(j) = AWh_\tau(j) + n_\tau(j) \, j=1,2,\ldots,J$ (9)

where $n_\tau(j) \sim CN(0, R_n)$, $R_n = W R_v W^\dagger$, where $R_{v/n}$ are the spatial correlation matrix of the interference vector v/n.

A detection statistic that may be employed is expressed as:

$$S(\tau) = \max_m \sum_{j=1}^{J} |z_\tau(m,j)|^2 \begin{cases} \geq \eta \Rightarrow H_1(\tau) \\ < \eta \Rightarrow H_0(\tau) \end{cases}$$ (10)

where the index m ranges over the number of fixed beams.

When the interference is white, then the fixed-beam test reduces to:

$$\max_m w_m^\dagger \hat{R}_y(\tau) w_m = \max_m \sum_{j=1}^{J} |w_m^\dagger y_\tau(j)|^2 > \eta$$

which is the same test statistic as in Equation (10).

The general fixed-beam detection rule can be implemented, with some approximation, as:

$$\max_m w_m^\dagger R_v^{-1} \hat{R}_y(\tau) R_v^{-1} w_m > \eta'$$

The above equation may represent a fixed-beam detection solution for arbitrary cases of interference. The implementation of this parallels that of the optimal detector for non-white interference. The received input signal can be pre-whitened by the application of the inverse of the Cholesky factor of $R_x$ (denoted by $P_x$), followed by a detection statistic:

$$\max_m w_m^\dagger P_x^\dagger \hat{R}_z(\tau) P_x w_m > \eta'$$

where, as before, $z_\tau(j) = P_x y_\tau(j)$ is the input signal after the whitening operation and $\hat{R}_z(\tau)$ is its sample correlation matrix. The resulting signal may be referred to as a pre-whitened signal. This is computationally efficient and could be used to approximate the optimal solution for all types of interference environments. Although the number of beams in this discussion have been restricted to M, this condition can be relaxed. In that case, the fixed beam detector will be only trying to realize the optimal maximum eigenvalue detector by doing an exhaustive search over a pre-specified large number of beams.

Figure 4:
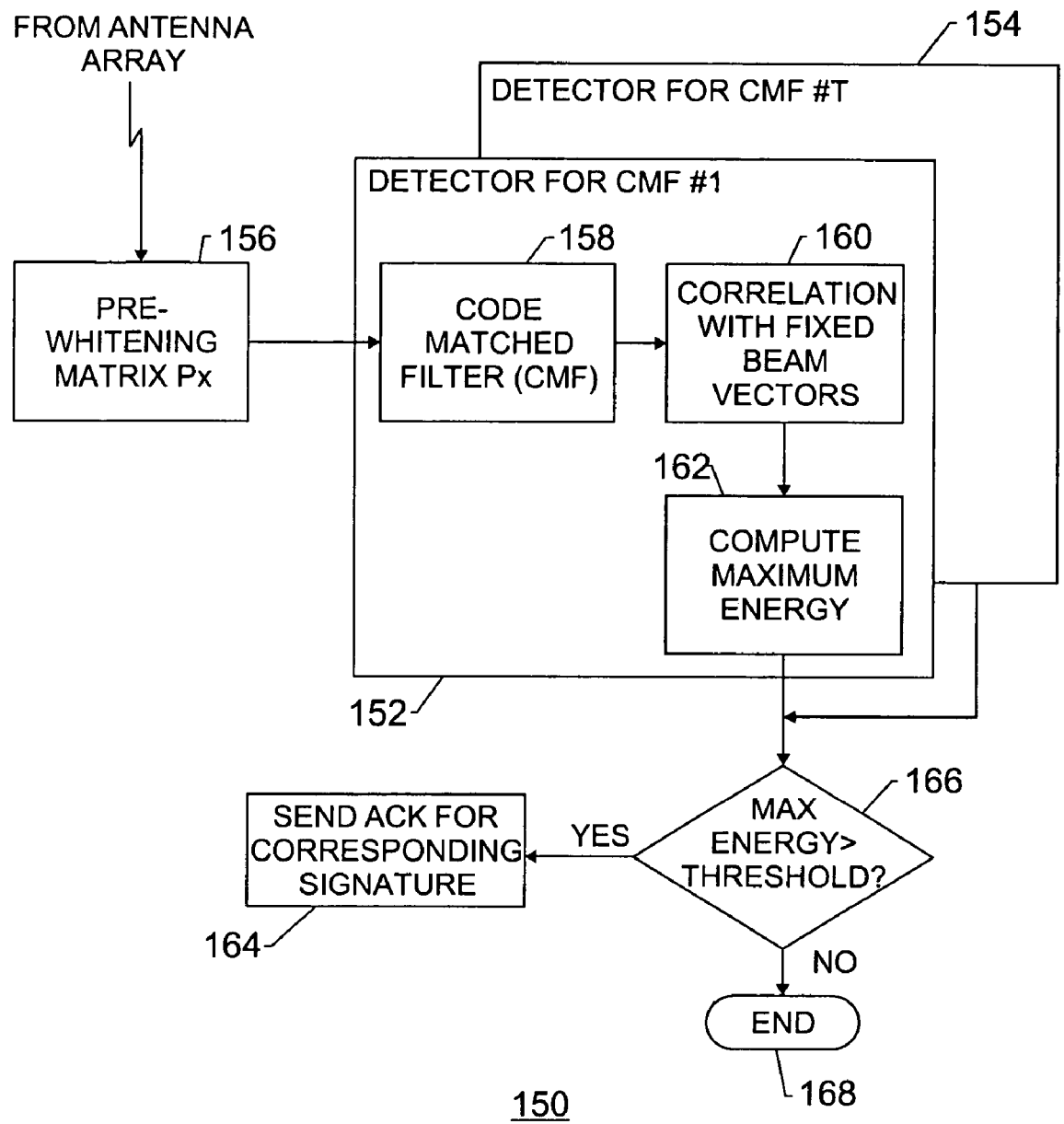
FIG. 4 is a block diagram illustrating an alternative embodiment of a random access detector in accordance with embodiments of the present invention.

FIG. 4 is a block diagram illustrating an alternative embodiment of a random access detector in accordance with embodiments of the present invention. A random access detector 150 is adapted to be deployed in a fixed beam network such as the fixed beam network 100 (FIG. 3). The random access detector 150 may comprise a plurality of detectors, each of the detectors being adapted to detect a different preamble or signature from a mobile transceiver. The different preambles or signatures may correspond to requests for service from various mobile transceivers in a cell at a given time. For purposes of simplicity, the exemplary random access detector shown in FIG. 4 is adapted to detect a single preamble or signature. Additionally, the random access detector 150 may be adapted to function for each of the beams in the fixed beam network in which it is deployed. In FIG. 4, the detector 150 is illustrated as being adapted to perform detection for all the beams within a fixed beam network.

A detector 152 may be adapted to detect a specific preamble or signature at a first time delay. A detector 154 may be adapted to detect the same preamble or signature at a Tth time delay. Those of ordinary skill in the art will appreciate that the effectiveness of the random access detector 150 may improve as detectors for more time delays are added for each specific preamble or signature.

To detect an incoming request for service, the random access detector 150 may monitor signals received from an antenna array such as the antenna array 12 (FIG. 1), which may include closely spaced antenna elements. The antenna array 12 may additionally comprise a plurality of widely dispersed clusters, each of the clusters being comprised of a plurality of closely spaced antenna elements. The signals received from the antenna array 14 may be processed by a pre-whitening matrix Px 156 to enhance the detectability of preambles or signatures contained within the signal. After processing by the pre-whitening matrix Px 156, the received signal is delivered to a code matched filter (CMF) 158, which is adapted to detect a signal corresponding to a particular preamble or signature. The CMF 158 output signal is processed to produce correlation values (block 160) based on the fixed beam vectors to which the detector 152 relates. Maximum energy levels for the correlations are computed at block 162.

At block 166, the maximum energy levels for each of the detectors 152 through 154 are examined to determine if the maximum energy level for any time delay exceeds a threshold. If the maximum energy level for any time delay exceed the threshold, an acknowledge signal may be sent for the corresponding preamble or signature, as shown at block 164. If the maximum energy level does not exceed the threshold for any of the time delays, no acknowledge signal is sent and the process ends, as shown at block 168.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A communication system, comprising:
   a pre-whitening device adapted to apply pre-whitening data to a received signal to produce a pre-whitened signal;

at least one detector that is adapted to recognize a pattern corresponding to a request for access in the pre-whitened signal and compute correlation data corresponding to the pattern, wherein computing correlation data comprises computing a correlation matrix and a maximum eigenvalue; and a threshold detector adapted to determine whether the maximum eigenvalue exceeds a threshold and indicates that an acknowledgement signal should be transmitted if the threshold is exceeded.

2. The system set forth in claim 1, wherein the correlation data is used to compute a maximum energy level for the pre-whitened signal.

3. The system set forth in claim 1, wherein the at least one detector is adapted to recognize the pattern in a specific beam of a fixed beam network.

4. The system set forth in claim 1, wherein the communication system comprises at least a portion of a cellular base station.

5. The system set forth in claim 1, wherein the pre-whitening data comprises a pre-whitening matrix.

6. A method for operating a communication system, the method comprising the acts of:

creating a pre-whitened signal by applying pre-whitening data to a received signal;

detecting a pattern that corresponds to a request for access in the pre-whitened signal;

computing correlation data corresponding to the pattern, wherein computing correlation data comprises computing a correlation matrix and a maximum eigenvalue;

determining whether the maximum eigenvalue exceeds a threshold; and indicating that an acknowledgement signal should be transmitted if the threshold is exceeded.

7. The method set forth in claim 6, comprising the act of using the correlation data to compute a maximum energy level for the pre-whitened signal.

8. The method set forth in claim 6, comprising the act of recognizing the pattern in a specific beam of a fixed beam network.

9. The method set forth in claim 6, comprising the act of defining a pre-whitening matrix to correspond to the pre-whitening data.

10. A communication system, comprising:

means for applying pre-whitening data to a received signal to produce a pre-whitened signal;

means for recognizing a pattern in the pre-whitened signal, the pattern corresponding to a request for access;

means for computing correlation data corresponding to the pattern, wherein computing correlation data comprises computing a correlation matrix and a maximum eigenvalue; and means for determining whether the maximum eigenvalue exceeds a threshold and for providing an indication if the threshold is exceeded.

11. A cellular base station, comprising:

an antenna array that receives a communication signal;

a pre-whitening device adapted to apply pre-whitening data to the communication signal to produce a pre-whitened signal;

at least one detector adapted to recognize a pattern corresponding to a request for access in the pre-whitened signal and compute correlation data corresponding to the pattern, wherein computing correlation data comprising computing a correlation matrix and a maximum eigenvalue;

a threshold detector adapted to determine whether the maximum eigenvalue exceeds a threshold and indicate that an acknowledgement signal should be transmitted if the threshold is exceeded; and processing circuitry adapted to support a communication session if an acknowledgment signal is transmitted.

12. The cellular base station set forth in claim 11, wherein the correlation data is used to compute a maximum energy level for the pre-whitened signal.

13. The cellular base station set forth in claim 11, wherein the pre-whitening data comprises a pre-whitening matrix.

* * * * *